United States Patent
Paulus et al.

(10) Patent No.: US 8,636,226 B2
(45) Date of Patent: Jan. 28, 2014

(54) AID FOR LOADING A SOLID FUEL BOILER COUPLED WITH AN ACCUMULATION SYSTEM

(75) Inventors: Cedric Paulus, La Ravoire (FR); Phillipe Papillon, Chambery (FR)

(73) Assignee: Commissariat a l'Energie Atomique, Paris (FR)

( * ) Notice: Subject to any disclaimer, the term of this patent is extended or adjusted under 35 U.S.C. 154(b) by 1173 days.

(21) Appl. No.: 12/502,463

(22) Filed: Jul. 14, 2009

(65) Prior Publication Data
US 2010/0012740 A1   Jan. 21, 2010

(30) Foreign Application Priority Data

Jul. 16, 2008   (FR) .................................. 08 54824

(51) Int. Cl.
- *F23K 3/22* (2006.01)
- *F23K 3/00* (2006.01)
- *F23N 1/00* (2006.01)
- *F23B 40/00* (2006.01)

(52) U.S. Cl.
USPC ............ 237/12.1; 237/2 A; 237/8 A; 237/12; 237/13; 237/81; 126/502; 126/344; 126/271.3; 122/449; 122/16.1; 122/30

(58) Field of Classification Search
CPC .................................. F23K 3/22; F23N 1/002
USPC ......... 237/12.1, 2 A, 2 R, 4, 8 A, 8 R, 12, 13, 237/19, 56, 62, 81; 126/502, 344, 367.1, 126/271.3, 107, 68; 122/449, 16.1, 30
IPC ................ F23K 3/22; F23N 1/00; F23B 40/00, F23B 50/00
See application file for complete search history.

(56) References Cited

U.S. PATENT DOCUMENTS

| | | | | |
|---|---|---|---|---|
| 2,753,928 A | * | 7/1956 | Vanderlip | ........................ 122/10 |
| 2,833,273 A | * | 5/1958 | Miller | ........................... 122/14.3 |
| 4,381,075 A | * | 4/1983 | Cargill et al. | .................. 237/8 R |
| 4,389,949 A | * | 6/1983 | Heep | ........................ 110/101 CF |
| 4,415,119 A | * | 11/1983 | Borking et al. | .................. 237/19 |
| 4,418,649 A | * | 12/1983 | Purvis | ........................... 122/16.1 |
| 4,444,538 A | * | 4/1984 | Manley | ......................... 414/173 |

(Continued)

FOREIGN PATENT DOCUMENTS

| | | | | |
|---|---|---|---|---|
| DE | 102007050318 A1 | * | 4/2009 | ................ F23K 3/00 |
| JP | 59164825 A | * | 9/1984 | ................ F23N 5/24 |
| JP | 01217101 A | * | 8/1989 | .............. F22B 35/00 |

OTHER PUBLICATIONS

French Search Report dated Jul. 29, 2009.

*Primary Examiner* — Steven B McAllister
*Assistant Examiner* — Daniel E Namay
(74) *Attorney, Agent, or Firm* — Pearne & Gordon LLP (57) ABSTRACT

The invention relates to a method for estimating the fuel supply of a boiler, for a building (2) having a boiler (4) and energy accumulation means (4'), in order to ensure a desired indoor temperature during an autonomy period P, this method including the following steps:
  a) making an estimation of the average outdoor temperature during the autonomy period P,
  b) determining the consumption of the building (2) in order to ensure said desired indoor temperature, depending on the previous estimation of the average outdoor temperature,
  c) determining the amount of energy to be provided depending on the previous consumption, and the amount of fuel required for providing this energy.

13 Claims, 2 Drawing Sheets

(56) References Cited

U.S. PATENT DOCUMENTS

| | | | | |
|---|---|---|---|---|
| 4,527,246 | A | * | 7/1985 | Masson .................. 700/300 |
| 4,850,310 | A | * | 7/1989 | Wildgen ................. 122/446 |
| 5,053,978 | A | * | 10/1991 | Solomon ................ 702/54 |
| 5,244,146 | A | * | 9/1993 | Jefferson et al. .......... 236/11 |
| 5,337,955 | A | * | 8/1994 | Burd ..................... 236/91 F |
| 6,073,690 | A | * | 6/2000 | Raley .................... 165/241 |
| 6,409,090 | B1 | * | 6/2002 | Gilvar et al. ............. 237/2 A |
| 6,454,179 | B1 | * | 9/2002 | Neve et al. .............. 237/2 A |
| 6,536,678 | B2 | * | 3/2003 | Pouchak ................. 237/7 |
| 6,647,302 | B2 | * | 11/2003 | Pouchak ................. 700/83 |
| 6,754,541 | B2 | * | 6/2004 | O'Leary et al. ........... 700/19 |
| 8,326,466 | B2 | * | 12/2012 | Peterson ................. 700/276 |
| 2007/0010914 | A1 | | 1/2007 | Johnson et al. |
| 2008/0046387 | A1 | | 2/2008 | Gopal et al. |

* cited by examiner

AID FOR LOADING A SOLID FUEL BOILER COUPLED WITH AN ACCUMULATION SYSTEM

TECHNICAL FIELD AND PRIOR ART

The invention relates to the field of devices for regulating boilers, in particular boilers with solid fuel such as wood or coal. It may also be applied as a device for regulating storage tanks.

The regulation of a boiler is a complex operation, because it involves many parameters.

Solid fuel heating has many constraints in order to obtain good combustion, synonym of optimum yields, minimum pollutant emissions and of increased lifetime of the boiler.

Supplying fuel to the boiler is accomplished manually, and the amount of fuel loaded in the hearth is most often burnt at a rated power. As the heating and the sanitary hot water needs are not necessarily matched to the available energy from the boiler, it is advised to couple this device to a buffer tank with which the non-consumed energy may be stored in order to give it back subsequently.

New loading of fuel for the boiler is performed when the hydro-accumulated energy is no longer sufficient: it is sought to match the amount of loaded wood to the needs and to the maximum amount of energy which the buffer tank may accumulate.

Presently, the amount of fuel to be loaded in the boiler and its frequency are estimated by the user from his/her perception of the heating needs, depending on his/her experience and on climatic conditions, but also from an estimation of the remaining energy in the buffer tank.

But the heating and sanitary hot water needs vary during the year, from one house relatively to another, and from one site relatively to another, and the user cannot necessarily know what will be his/her needs during the next hours. Further, the accumulated energy supply is variable and difficult to estimate by the user. Therefore, it is difficult for him/her to properly supply his/her boiler with solid fuel.

The problem is therefore posed of finding a method and a device providing determination of the supply of solid fuel for a boiler, depending on objective parameters.

DISCUSSION OF THE INVENTION

The invention notably relates to a method and a device providing optimization of the loading of a solid fuel boiler, in particular of the type coupled to an accumulation system.

It first relates to a method for estimating the fuel supply for a boiler, for a building having a boiler and energy accumulation means, in order to ensure a desired temperature, inside the building, during a period P, for example a period of autonomy P, this method including the following steps:

a) making an estimation of the average temperature on the outside of the building, during the period of P, b) determining the consumption of the building in order to ensure said desired indoor temperature, depending on the previous estimation of the average outdoor temperature, c) determining the amount of energy to be provided depending on the previous consumption, and the amount of fuel required for providing this energy.

According to the invention, the average and optionally instantaneous outdoor temperature which will occur during the period P, is estimated beforehand. Next, the average and optionally instantaneous consumption of the building is estimated, in order to ensure the desired indoor temperature taking the estimated outdoor temperature into account. The amount of energy to be provided and the amount of fuel required for providing this energy are inferred therefrom.

According to one embodiment, the step a) applies a measurement of an outdoor temperature, either instantaneous and/or conducted during a period prior to the period P, for example it also of duration Δt.

According to another aspect of the invention, the step b) applies determination of a characteristic of the building, a so-called energy signature, which represents the consumption of the building according to the difference between an indoor temperature $T_{int}$ and an outdoor temperature $T_{ext}$.

It is optionally possible to compare for a period prior to a period P, for example a period of autonomy, the estimated heating needs, and the actual heating needs. The energy signature may be corrected depending on the result of this comparison.

The step for determining the amount of energy to be provided and the required fuel consumption may result from the consideration of parameters such as the indoor temperature, and/or energy loss factors, and/or the energy consumed during the relevant duration, and/or the energy already stored in the accumulation system.

It is therefore for example possible during step c) to at least consider:

the heating autonomy at the beginning of the period P, the maximum amount of energy which may be stored in the accumulation means, the minimum amount of energy which may be loaded into the boiler, and the maximum amount of energy which may be loaded into the boiler.

According to one embodiment, the amount of energy to be loaded is equal to the smallest of the two following amounts:

the difference between the maximum storable energy in the accumulation means and the available energy in the accumulation means, the maximum energy which may be loaded into the boiler, and this while being larger than the minimum energy which may be loaded into the boiler.

With the invention it is notably possible to indicate to a user the information required for proper loading of the boiler in order to provide the energy needs of the next hours or of the period P, notably the following information:

the remaining energy in the accumulation means, the energy to be loaded into the boiler, the heating autonomy.

In a method according to the invention, it is possible to further make an estimation of at least one instantaneous outdoor temperature during the period P. From this, an hourly distribution of the heating needs may be estimated during this period P. A calculation of the consumption of the building may notably be performed for a plurality of instants during the autonomy period P Δt.

The invention may be applied with digital data processing means, for example a computer or a microcomputer.

The invention also relates to a device for estimating the fuel supply of a boiler having accumulation means, for a building, including:

a) means for determining the consumption of the building in order to ensure a desired indoor temperature of the building during a period P, for example a period of autonomy, from an estimation of an average outdoor temperature of the building during the period P, b) means for determining the amount of energy to be provided depending on the previous consumption, and the amount of fuel required for providing this energy. Such means apply a method as described above.

A system for heating a building includes according to the invention:

a boiler for carrying out combustion of a fuel and means for accumulating energy, a device, as described above, for estimating the fuel supply of the boiler.

Such a heating system may further include means for measuring at least one temperature outside the building and at least one indoor temperature.

Such a system may further include means for measuring the amount of available energy in the accumulation means.

The invention also relates to a building, having a heating system according to the invention as described above, and heating means.

DETAILED DISCUSSION OF PARTICULAR EMBODIMENTS

The invention applies to a building 2 (FIG. 3) including a boiler 4. The latter is associated or coupled with or connected to accumulation means 4', which for example have the shape of a heated water tank. A fluid contained in these accumulation means will be able to be used in order to be sent to means 15 for heating the inside of the building. The boiler enables the fluid to be heated (for example water), contained in the accumulation means 4'.

Figure 3:
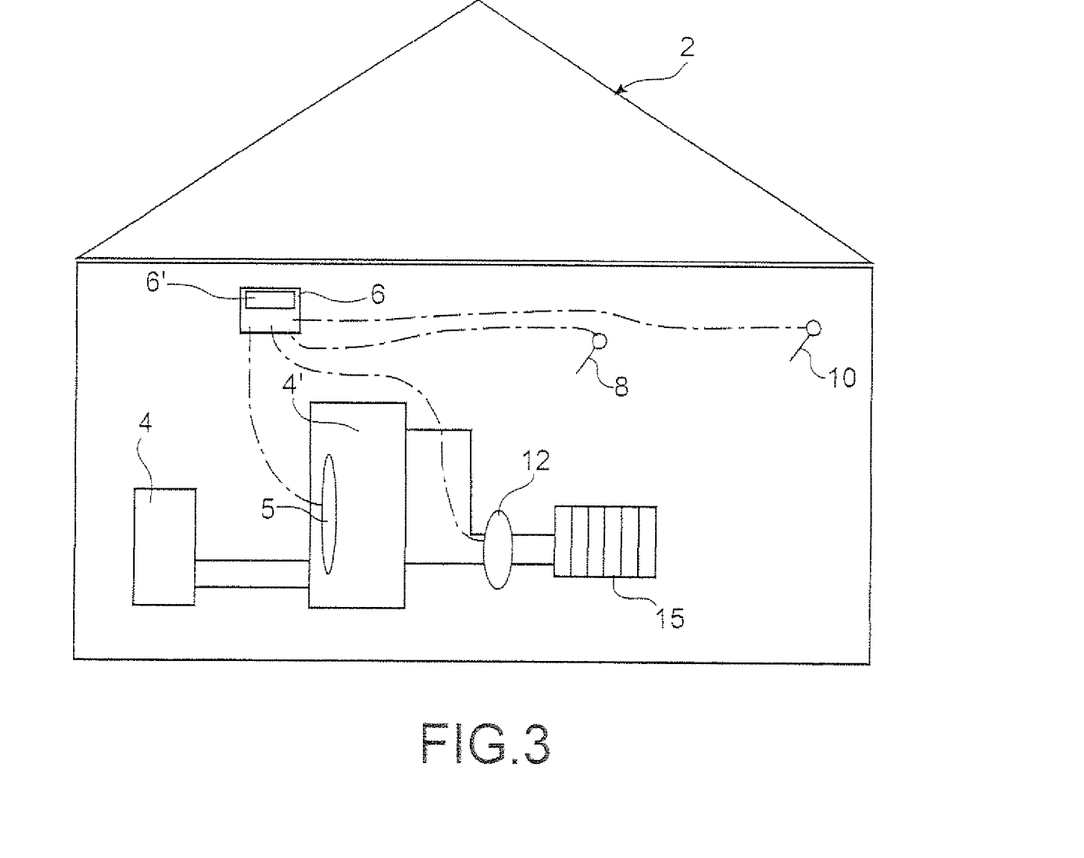
FIG. 3 illustrates a building equipped with a boiler regulated by a method and a device according to the invention.

It is sought to regulate such a system in order to ensure a certain temperature during a certain duration, which can be an autonomy duration Δt. An autonomy duration can be a duration during which the system functions independently of any human intervention, in particular, without any additional loading of fuel into the boiler. Subsequently, this duration or autonomy duration will most often be considered as being equal to 24 hours, or to one day, but it may be of a different value.

The building may be a residential building, for example a house or a flat, but also any other type of building, for example a utility building, such as a factory or a warehouse or a production unit or an office building.

As this is further seen in FIG. 3, the building 2 is equipped with means 8, 10 for measuring the indoor temperature and the outdoor temperature.

It further comprises:

a device or means 6 for acquiring and computing or processing data, means 5 for measuring the energy stored in the accumulation means 4, means 12 for measuring the heating energy.

Reference 15 designates means for heating the building 2.

The temperature-measuring means 8, 10 are illustrated in FIG. 3 as directly connected to the acquisition device 6, but the temperature data may also be provided to this device 6 via another separated acquisition device which itself collects temperature data from the sensors 8, 10.

The acquisition, calculation or processing device 6 therefore directly or indirectly recovers all the measurements, carries out the estimations and displays the loading-aid results.

It may be equipped with a microprocessor. This may be a microcomputer. The device or the means 6 is/are in any case programmed in order to execute a method according to the invention, for estimating the required supply for the heating system in order to maintain a desired temperature, or to carry out a desired temperature cycle in the interior of the building. This device will notably carry out calculations of average or instantaneous outdoor temperature and of consumption of the building, in order to ensure heating or the desired heating cycle.

Preferably, it is provided with indication means 6' with view to presenting a user with certain results of calculations or estimations, in particular of the final amount of fuel which has to be provided to the heating system.

Steps of a method according to the invention are described below.

Figure 1:
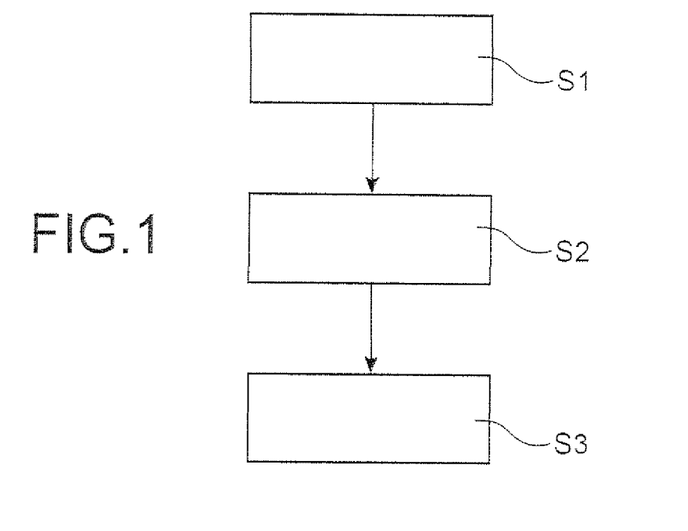
FIG. 1 is a flowchart of a method according to the invention, as an aid for loading solid fuel into the boiler.

A first method according to the invention is illustrated schematically in FIG. 1.

In a first step, S1, an average outdoor temperature is estimated throughout the period during which it is desired to heat the building autonomously. It is also possible during this estimation step to estimate instantaneous outdoor temperatures.

In a second step S2, it will be sought to determine the consumption of the building in order to ensure a desired indoor temperature for an autonomy duration Δt. For this purpose, a function may be used, which will have been possibly determined beforehand, and which relates the consumption of the building to the outdoor, average or instantaneous temperature, or to an estimation of this instantaneous or average outdoor temperature, or to the difference ΔT between this outdoor temperature and the indoor temperature.

This function may be called an <<energy signature>> and is noted as $B_{heating}$. It may be expressed in polynomial form, such as:

$$a(\Delta T)^2 + b(\Delta T) + c.$$

The coefficients a, b, c may for example be determined from measurements of temperatures and from heating needs of the building during the preceding days.

It is then sought (step S3) to determine the amount of energy to be provided depending on the previous consumption, and the amount of fuel required for providing this energy.

During this step, various parameters may be considered, such as the heating autonomy at the beginning of the autonomy period Δt, the maximum amount of energy which may be stored in the accumulation device, the minimum amount of energy which may be loaded into the heating system and the maximum amount of energy which may be loaded into the heating system.

Preferably, the amount of energy to be loaded is equal to the smallest of the two following amounts:

the difference between the maximum energy which may be stored in the accumulation system and the available energy in the accumulation system, the maximum energy which may be loaded into the boiler, and this while being larger than the minimum energy which may be loaded into the boiler.

This amount of energy having been determined, as well as the corresponding fuel amount, it is possible to supply the heating system with said amount of fuel.

Figure 2:
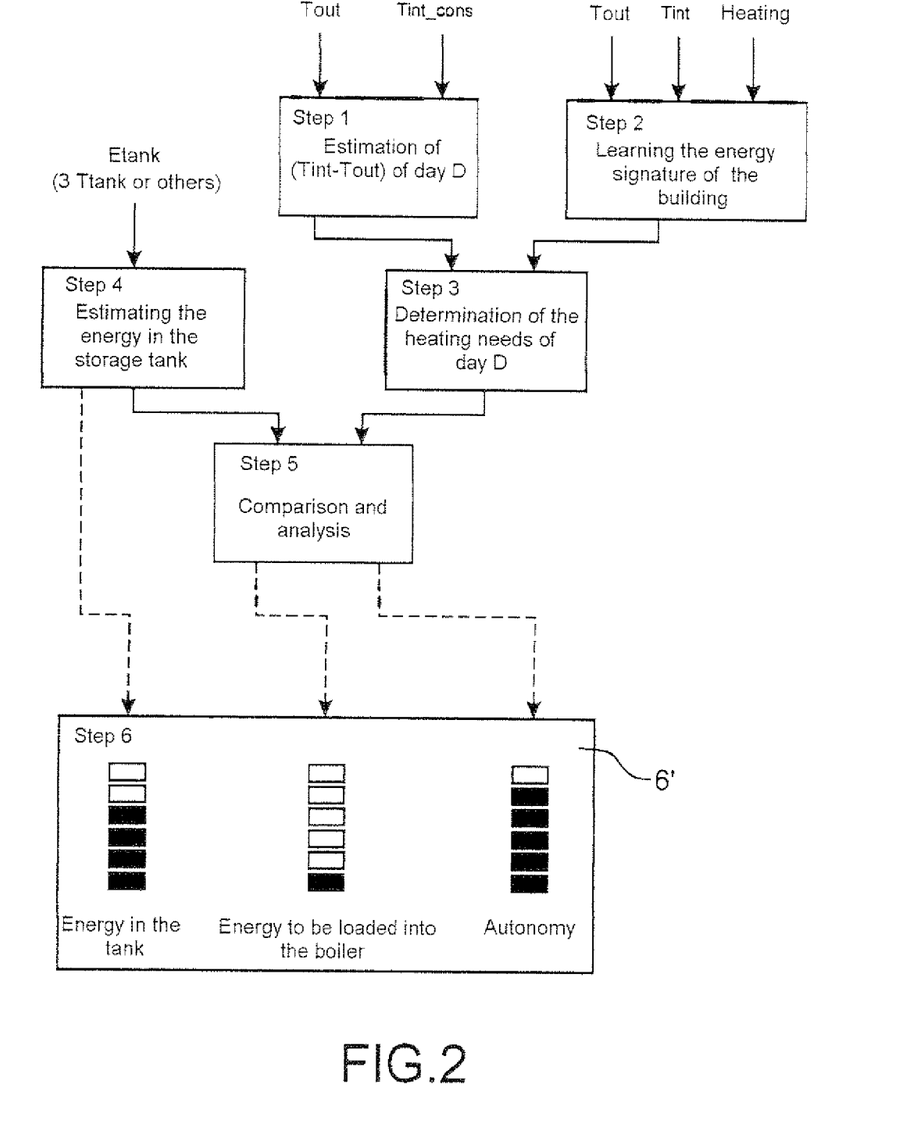
FIG. 2 is a flowchart of another method, according to the invention, as an aid for loading solid fuel into the boiler.

A more particular embodiment of a method of the invention will now be described. This embodiment includes 6 steps which will be detailed below. In turn, each of the steps is divided into sub-steps, in order to facilitate understanding of the explanations. This embodiment is illustrated in FIG. 2, organized in a different way from FIG. 1; the numbering of the mentioned steps S1-S4 above does not necessarily correspond to the numbering of the steps of this embodiment.

Step 1:

As a simplification, a sliding period P of 24 hours is considered. P represents the next 24 hours and the period P-1, the last 24 hours. But this embodiment may be applied for a period P of any duration, not only a 24 hour duration.

During the first step, average and possibly instantaneous outdoor and indoor temperatures as well as a difference between these outdoor and indoor temperatures will be estimated.

(1.1) Estimation of the Average Outdoor Temperature for Period P:

The average outdoor temperature of the period P may for example be estimated:

A) according to the maximum outdoor temperature of period P-1, and to the outdoor temperature measured at the instant of the estimation, for example as an average of both of these temperatures;

B) or according to the outdoor temperature measured at the instant of the estimation, for example in the middle of the morning; for example it is considered that the average outdoor temperature of period P is equal to such a measured outdoor temperature;

C) or according to the minimum outdoor temperature of the period P-1, and the outdoor temperature measured at the instant of the estimation, for example as an average of both of these temperatures.

It is possible to make an estimation of the average outdoor temperature first only depending on the data of period P-1, and to correct it depending on the data of the period P.

Thus, for example, it is 6 am, the average outdoor temperature of the period P may be calculated in the following way:

$$T_{out\_avg\_P} = \frac{T_{out\_measured\_6am} + T_{out\_max\_P-1}}{2} \quad \text{(formula A)}$$

But, if the estimation measurement is conducted at another time, it may be interesting to use the other formulae.

For example:

at 10 am: $T_{out\_avg\_P} = T_{out\_measured\_10am}$ (formula B)

at 3 pm: $T_{out\_avg\_P} = \frac{T_{out\_min\_P-1} + T_{out\_measured\_3pm}}{2}$ (formula C)

10 pm: $T_{out\_avg\_P} = T_{out\_measured\_10pm}$ (formula B)

It is also possible to estimate the minimum and maximum outdoor temperatures of the period P (for example the next 24 hours), for example at different times of the day:

a) for the minimum outdoor temperature:

according to the minimum outdoor temperature of period P-1, to which it may be equal;

according to the estimated average outdoor temperature for the period P (see estimations above) and to an outdoor temperature of the period P-1; for example, it is considered that the minimum outdoor temperature of the period P is equal to twice the average estimated outdoor temperature of the period P minus the maximum outdoor temperature of the period P-1;

b) for the maximum outdoor temperature:

according to the maximum outdoor temperature of the period P-1, to which it may be equal;

according to the estimated average outdoor temperature of the period P (see estimations above) and an outdoor temperature of the period P-1; for example, it is considered that the maximum outdoor temperature of the period P is equal to twice the estimated average outdoor temperature minus the minimum outdoor temperature of the period P-1 or the outdoor temperature of the period P-1 at a determined time, for example 6 am.

According to a few examples:

at 6 am: $T_{out\_avg\_P} = T_{out\_meas\_6\,am}$ and $T_{out\_max\_P} = 2 \times T_{out\_avg\_P} - T_{out\_meas\_6\,am}$ at 10 am: $T_{out\_min\_P} = T_{out\_min\_P-1}$ and $T_{out\_max\_P} = 2 \times T_{out\_avg\_P} - T_{out\_min\_P-1}$ at 3 pm: $T_{out\_min\_P} = T_{out\_min\_P-1}$ and $T_{out\_max\_P} = T_{out\_meas\_3\,pm}$ at 10 pm: $T_{out\_min\_P} = 2 \times T_{out\_avg\_P} - T_{out\_max\_P-1}$ and $T_{out\_max\_P} = T_{out\_max\_P-1}$ Knowing the estimated average outdoor temperature of the period P, it is possible to estimate an hourly profile of the outdoor temperature for period P, for example with the following sine function:

$$T_{out\_H\_P} = \frac{T_{out\_min\_p} + T_{out\_max\_p}}{2} + \frac{T_{out\_min\_p} - T_{out\_max\_p}}{2} \times \sin\left(\frac{(H+Ho)-9}{12} \times \pi\right)$$

With:

$T_{out\_H\_P}$: the outdoor temperature estimated for the period P, at instant H;

$T_{out\_min\_P}$: the minimum estimated outdoor temperature for the period P;

$T_{out\_max\_P}$: the maximum outdoor temperature for the period P;

H: the instant among the 24 hours of the period P for which the outdoor temperature is estimated;

Ho: the actual time of the day at which the estimation is made.

(1.2) Estimation of the Indoor Temperature for Period P:

The average indoor temperature of the period P may be calculated according to the average indoor temperature of one or several of the preceding days, from the following expressions:

$T_{int\_avg\_P} = T_{int\_avg\_P-1}$ if a constant profile was detected;

or $T_{int\_avg\_P} = T_{int\_avg\_P-7}$ if a weekly profile was detected.

The average indoor temperature of the period P may also be calculated depending on a set temperature programmed by the user.

The time profile of the indoor temperature is either determined according to the profiles of the preceding days, or according to a set time indoor temperature programmed by the user.

(1.3) Estimation of the Difference Between the Average Indoor Temperature of the Period P and the Average Outdoor Temperature of the Period P:

An estimation of the difference between the average indoor temperature of the period P and the average outdoor temperature of the period P may be made starting with a subtraction between an estimation of the average indoor temperature of the period P and an estimation of the average outdoor temperature of the period P.

An hourly estimation of the difference between the hourly indoor temperature of the period P and the hourly outdoor temperature of the period P may be made starting with a subtraction between an estimation of the hourly indoor temperature of the period P and an estimation of the hourly outdoor temperature of the period P.

Step 2:

2.1) Definition of the Energy Signature of a Building:

Each building has an energy signature which represents the consumption of the building depending on the outdoor temperature or depending on the difference between the indoor temperature and the outdoor temperature. It may be written in the form of the following equation:

$$B_{heating} = a \times (T_{int} - T_{out})^2 + b \times (T_{int} - T_{out}) + c = \theta^T \cdot \Phi$$

wherein there are two matrices (1×3):

$$\theta = [a \ b \ c]$$

$$\Phi = [(T_{int} - T_{out})^2 (T_{int} - T_{out}) 1]$$

In fact, this is a polynomial of the second degree function of $(T_{int} - T_{out})$ From measurements of the outdoor temperature, of the indoor temperature and of the heating needs of the building from the previous periods, the developed methodology enables the energy signature of the building to be matched with actual data.

This $B_{heating}$ formula may be applied as well to the average values of the outdoor and indoor temperatures determined earlier, in order to determine the average heating needs for the period P, as to the instantaneous values of the outdoor and indoor temperatures, in order to determine the hourly distribution of the heating needs for the period P.

2.2) Adjustment of the Parameters of the Energy Signature of the Building by an On-Line Method:

Every day, the average outdoor temperature and the average indoor temperature may be measured or estimated, with which the heating needs may be predicted.

The actual heating needs which represent the energy dissipated by the heating circuit in the building is measured, for example from an energy meter located on the heating circuit.

The estimated heating needs (the energy signature) is compared with the actual heating needs measured for the same period (these are therefore the estimated and measured needs of an elapsed period). Depending on the result of this comparison, the system 6 may automatically adjust the parameters of the model, preferably in real time and without requiring off-line processing of the information.

For example, the following algorithm may be used for adjusting the parameters a, b and c:

$$\theta(t) = \theta(t-1) + K(t) \cdot e(t)$$

The variable t represents the days.

The matrices e and K respectively represent the a priori error between the measured heating needs and the estimated heating needs, and the adaptation gain to be applied in order to take into account this error. Both of these matrices are calculated in the following way:

$$\text{A priori error: } e(t) = B_{heating}(t) - \Phi^T(t) \cdot \vartheta(t-1)$$

$$\text{Adaptation gain: } K(t) = \frac{P(t-1) \cdot \Phi(t)}{\frac{\lambda}{\mu} + \vartheta^T(t) \cdot P(t-1) \cdot \vartheta(t)}$$

The matrix P is calculated and updated again in the following way:

$$P(t) = \frac{1}{\lambda}\left(P(t-1) - \frac{P(t-1) \cdot \Phi(t) \cdot \Phi^T(t) \cdot P(t)}{\frac{\lambda}{\mu} + \vartheta^T(t) \cdot P(t-1) \cdot \vartheta(t)}\right)$$

The coefficient $\lambda$ is a forgetting factor and the coefficient $\mu$ is a weighting factor.

The equations of this algorithm are supposed to allow determination of a, b and c. Generally, a system of 3 equations with 3 unknowns has to be solved.

The readjustment of the parameters of the energy signature may occur at predetermined instants, for example every 24 hours at 0 hours.

The methodology for determining the signature of the building is self-adaptive so that it is possible to automatically take into account future developments of the building. Indeed, the signature is regularly corrected by readjusting the parameters. For example, an extension of the building, an improvement in the insulation, ... will therefore be taken into account.

Step 3:

(3.1) Estimation of the Daily Heating Needs for the Period P:

From the $B_{heating}$ function, representative of the energy signature determined in step 2, and from the estimation of the difference between the average indoor temperature and the estimated average outdoor temperature of the period P in step 1, the daily heating needs of the period P are determined. They are calculated from the following equation:

$$B_{heating\_P} = a \times (T_{int\_avg\_P} - T_{out\_avg\_P})^2 + b \times (T_{int\_avg\_P} - T_{out\_avg\_P}) + c$$

(3.2) Estimation of the Hourly Distribution of the Daily Heating Needs of Period P:

The hourly distribution of the heating needs of the period P is calculated from the hourly difference between the indoor temperature and the estimated outdoor temperature of the period P and from the representative curve of the energy signature of the building in the following way:

$$B_{heating\_H\_P} = \frac{a \times (T_{int\_H\_P} - T_{out\_H\_P})^2 + b \times (T_{int\_H\_P} - T_{out\_H\_P}) + c}{24}$$

This amount $B_{heating}$ represents heating needs which may change depending on H. This information is useful for managing the energy supply available in the accumulation means.

The heating needs are thus known over the next 24 hours.

Step 4:

Estimation of the Usable Energy Available in the Accumulation System:

During this step, the usable energy available in the accumulation means 4' (FIG. 3) may be estimated at the beginning of the period P over which the needs are to be determined. This information may be the result of a device specific to the type of storage or of measurements conducted on this accumulation system.

If the accumulation system 4' is a water accumulation tank, the available usable energy may be estimated from the measurement of the average temperature of the water stored and from the volume of the storage device.

The volume of the accumulation system may have been parameterized beforehand by the user.

The average temperature of the storage tank 4' may be estimated, for example from the average of several temperature sensors located in the tank, for example 3 sensors, one at $\frac{1}{6}^{th}$ of the tank, one at the half of the tank and one at $\frac{5}{6}^{th}$ of the tank.

Step 5:

In a fifth step, the information from steps 3 (determination of the energy needs) and 4 (estimation of the available usable energy at the beginning of the period) are compared and analyzed with the purpose of determining the heating autonomy with the presently available energy in the accumulation system, and possibly the amount of energy to be loaded into the solid fuel boiler.

(5.1) Estimation of the Heating Autonomy:

The heating autonomy represents the number of hours during which the energy available in the accumulation system is able to meet the heating needs. Knowing the time heating needs during the period P and the available energy in the accumulation system, this value may easily be calculated by a difference.

(5.2) Estimation of the Amount of Energy to be Loaded into the Boiler:

The amount of energy to be loaded into the boiler is calculated from:
- the heating autonomy;
- the maximum amount of energy which may be stored in the accumulation system;
- and the minimum and maximum amounts of energy which may be loaded into the boiler. The minimum amount of energy <<loadable>> into the boiler, may be equal to 0, but sometimes a non-zero minimum is required for starting the boiler.

If the heating autonomy is above the minimum autonomy desired by the user, for example 8 h, then the system may ensure its autonomy right up to the next presence of the user, and the energy to be loaded into the boiler may be zero.

If the heating autonomy is less than the desired minimum autonomy, then the amount of energy to be loaded into the boiler is calculated in the following way.

First of all, the parameters which define the limits of the amount of energy to be loaded into the boiler are calculated:

The maximum energy which may be stored in the accumulation system $4'$ is a parameter entered by the user. If the storage device is a water accumulation tank, the maximum storable energy is calculated from the volume $V_{tank}$ of the tank, from the maximum storage temperature and from the minimum usable temperature in the heating system:

$$E_{storage\_maxi} = V_{tank} \times C_P \times (T_{tank\_max} - T_{tank\_min})$$

wherein $C_P$ is the heat capacity of the liquid,

The maximum energy which may be loaded into the boiler corresponds to the amount of energy which represents the full load of fuel in the hearth of the boiler. This energy is calculated from geometrical characteristics of the boiler (volume of the hearth $V_{hearth}$), from the type of boiler and from the type of fuel (by the factor $\rho_{boiler}$, given by the manufacturer). The following formula may be used:

$$E_{boiler\_maxi} = V_{hearth} \times \rho_{boiler} \times LHP_{fuel}$$

(LHP represents the lower heat power, also given by the manufacturer),

The minimum energy which may be loaded into the fuel boiler 4 corresponds to a parameter entered by the user which corresponds to a datum from the boiler manufacturer depending on the type of the latter. In most cases, the minimum load is equal to 50% of the maximum load.

The amount of energy to be loaded into the boiler 4 is then equal to the minimum between:
- the difference between the maximum energy which may be stored in the accumulation system and the available energy in the accumulation system on the one hand,
- and the maximum energy which may be loaded into the boiler on the other hand.

Further, the amount of energy to be loaded into the boiler cannot be less than the minimum energy which may be loaded into the boiler. This may be represented by the following equation:

$$E_{boiler\_to\_load} = \max(E_{boiler\_mini}; \min((E_{storage\_maxi} - E_{storage\_avail}); E_{boiler\_maxi}))$$

In the case of a lack of stored energy, the boiler is loaded to a maximum in order to fill the tank to a maximum.

Step 6:

Information is provided to the user for properly loading his/her solid fuel boiler, for example:
- the available energy in the tank (calculated in step 4),
- the heating autonomy (calculated in step 5),
- the energy to be loaded into the boiler (calculated in step 5).

This information is transmitted to the user, for example via means such as viewing means or a display.

Therefore with a method and a device according to the invention, a user may properly load his/her solid fuel boiler thanks to information relating to:
- the remaining energy in the accumulation system,
- the energy to be loaded into the boiler,
- the heating autonomy.

A device according to the invention, installed in a building 2 is illustrated in FIG. 2.

Examples of applications of a method according to the invention will now be provided.

Example 1

Estimation of the Energy to be Loaded into the Boiler

In this example, a period P of 24 hours (which does not necessarily begin at 0.00 am) is considered.

The device for assisting the loading is installed on a heating system 4, 4' consisting of a 25 kW boiler 4 burning wood and/or logs with a hearth of 50 L and a water storage tank 4' of 1,000 L. The user has adjusted the set value of the room temperature to 20° C.

The user has adjusted the system with the following parameters:
- Set indoor temperature: 20° C. constant,
- Volume of the hearth of the boiler 4: 50 liters,
- Volume of the storage tank 4': 1,000 liters,
- Type of emitters 15: radiators,
- Desired minimum autonomy: 8 h.

The values measured on the previous day are:
- average temperature: 10° C.
- maximum temperature: 15° C.
- minimum temperature: 5° C.

It is 6 am, and the measured outdoor temperature is then 7° C.

Steps 1-6 will now be applied.

Step 1:

(1.1) Estimation of the Average Outdoor Temperature of the Period P:

The system 6 estimates the average outdoor temperature of the period P, during the next 24 hours in this example:

$$T_{out\_moy\_P} = \frac{T_{out\_measured\_6am} + T_{out\_max\_P-1}}{2} = \frac{7+15}{2} = 11° C.$$

The minimum and maximum temperatures over the next 24 hours are estimated in the following way:

$$T_{out\_min\_P} = T_{out\_meas\_6\,am} = 7° C. \text{ and } T_{out\_max\_P} = 2 \times T_{out\_avg\,P} - T_{out\_meas\_6\,am} = 2 \times 11 - 7 = 15° C.$$

The system 6 then estimates the hourly profile of the outdoor temperature for the next 24 hours.

(1.2) Estimation of the Average Indoor Temperature of the Period P:

The set indoor temperature is 20° C. constant over the period P.

(1.3) Estimation of the Difference Between the Average Indoor Temperature of the Period P and the Average Outdoor Temperature of the Period P:

The system 6 then calculates the difference between the hourly outdoor temperature and the set indoor temperature of the period P (the next 24 hours in the selected example).

The values of these temperatures are detailed in the Table below:

| Time of the day [h] | Interval between the present time and the estimation time [h] | Estimated outdoor temperature at time h [° C.] | Set indoor temperature at time h [° C.] | Difference: Indoor temperature − outdoor temperature [° C.], at time h |
|---|---|---|---|---|
| 7  | 1  | 9.0  | 20 | 11.0 |
| 8  | 2  | 10.0 | 20 | 10.0 |
| 9  | 3  | 11.0 | 20 | 9.0  |
| 10 | 4  | 12.0 | 20 | 8.0  |
| 11 | 5  | 13.0 | 20 | 7.0  |
| 12 | 6  | 13.8 | 20 | 6.2  |
| 13 | 7  | 14.5 | 20 | 5.5  |
| 14 | 8  | 14.9 | 20 | 5.1  |
| 15 | 9  | 15.0 | 20 | 5.0  |
| 16 | 10 | 14.9 | 20 | 5.1  |
| 17 | 11 | 14.5 | 20 | 5.5  |
| 18 | 12 | 13.8 | 20 | 6.2  |
| 19 | 13 | 13.0 | 20 | 7.0  |
| 20 | 14 | 12.0 | 20 | 8.0  |
| 21 | 15 | 11.0 | 20 | 9.0  |
| 22 | 16 | 10.0 | 20 | 10.0 |
| 23 | 17 | 9.0  | 20 | 11.0 |
| 24 | 18 | 8.2  | 20 | 11.8 |
| 1  | 19 | 7.5  | 20 | 12.5 |
| 2  | 20 | 7.1  | 20 | 12.9 |
| 3  | 21 | 7.0  | 20 | 13.0 |
| 4  | 22 | 7.1  | 20 | 12.9 |
| 5  | 23 | 7.5  | 20 | 12.5 |
| 6  | 24 | 8.2  | 20 | 11.8 |

Step 2:

(2.1) Definition of the Energy Signature:

With the measurements of the outdoor temperatures, of the indoor temperatures and of the heating needs of the previous periods, the energy signature of the building may be determined:

$$B_{heating} = a \times (T_{int} - T_{out})^2 + b \times (T_{int} - T_{out}) + c \, [\text{kWh}].$$

with: $a=0$; $b=6.28$; $c=-29.56$.

(2.2) Adjustment of the Parameters of the Energy Signature of the Building:

The readjustment of these parameters may occur at predetermined instants, for example every 24 hours, at a time defined as being 0 hours.

Step 3:

(3.1) Estimation of the Daily Heating Needs for the Period P:

The heating needs estimated for the next 24 hours are:

$$B_{heating\_P} = a \times (T_{int\_avg\_P} - T_{out\_avg\_P})^2 + b \times (T_{int\_avg\_P} - T_{out\_avg\_P}) + c$$

$$B_{heating\_P} = 0 \times (20-11)^2 + 6.28 \times (20-11) - 29.56 = 26.96 \, \text{kWh}$$

(3.2) Estimation of the Hourly Distribution of the Daily Heating Needs for the Period P:

The hourly profile of the heating needs is calculated from the equation:

$$B_{heating\_H\_P} = \frac{a \times (T_{int\_H\_P} - T_{out\_H\_P})^2 + b \times (T_{int\_H\_P} - T_{out\_H\_P}) + c}{24}$$

For the 1$^{st}$ hour following the present hour, the heating needs are:

$$B_{heating\_H1\_P} = \frac{0 \times (20-9)^2 + 6.28 \times (20-9) - 29.56}{24} = 1.65 \, \text{kWh}$$

The Table below summarizes the estimation of the hourly profile of the heating needs:

| Time of the day [h] | Interval between the present time and the estimation time [h] | Heating needs at time h [kWh] |
|---|---|---|
| 7  | 1  | 1.65 |
| 8  | 2  | 1.39 |
| 9  | 3  | 1.12 |
| 10 | 4  | 0.85 |
| 11 | 5  | 0.60 |
| 12 | 6  | 0.38 |
| 13 | 7  | 0.22 |
| 14 | 8  | 0.11 |
| 15 | 9  | 0.08 |
| 16 | 10 | 0.11 |
| 17 | 11 | 0.22 |
| 18 | 12 | 0.38 |
| 19 | 13 | 0.60 |
| 20 | 14 | 0.85 |
| 21 | 15 | 1.12 |
| 22 | 16 | 1.39 |
| 23 | 17 | 1.65 |
| 24 | 18 | 1.86 |
| 1  | 19 | 2.03 |
| 2  | 20 | 2.13 |
| 3  | 21 | 2.17 |
| 4  | 22 | 2.13 |
| 5  | 23 | 2.03 |
| 6  | 24 | 1.86 |

Step 4:

(4.1) Estimation of the Usable Energy Available in the Accumulation System:

The system estimates the usable energy available in the storage tank 4'. To do this, 3 temperature sensors were installed at the following relative heights: $\frac{1}{6}^{th}$ of the tank ($T_{tank1}$), $\frac{1}{2}$ of the tank ($T_{tank2}$) and $\frac{5}{6}^{th}$ of the tank ($T_{tank3}$).

These measurements of temperatures indicate the following values:

$T_{tank1}$: 35° C.
$T_{tank2}$: 45° C.
$T_{tank3}$: 55° C.

From these 3 measurements of temperatures, the system calculates the energy available in the tank from the following equation:

$$E_{storage} = V_{tank} \times C_p \times \left( \frac{T_{tank1} + T_{tank2} + T_{tank3}}{3} - T_{tank\_min} \right)$$

The volume $V_{tank}$ of the tank is 1,000 liters, the heat capacity $C_p$ of water is 4.18 kJ/kg/K (water) and the minimum temperature of the tank $T_{tank\_min}$, which corresponds to the minimum temperature which may be used by the heating system, is in this case 40° C. (the emitters 15 are radiators). One therefore has:

$$E_{storage} = \frac{1000 \times 4.18 \times \left(\frac{35+45+55}{3} - 40\right)}{3600} = 5.81 \text{ kWh}$$

Step 5:
(5.1) Estimation of the Heating Autonomy:
The system estimates the heating autonomy from the usable energy available in the storage tank and from the prediction of the heating needs:

| Time of the day [H] | Interval between the present time and the estimation time [H − Ho] | Heating needs [kWh] at time H | Remaining energy in the storage tank [kWh] at time Ho |
|---|---|---|---|
| 6 | 0 | — | 5.81 |
| 7 | 1 | 1.65 | 4.16 |
| 8 | 2 | 1.39 | 2.77 |
| 9 | 3 | 1.12 | 1.65 |
| 10 | 4 | 0.85 | 0.79 |
| 11 | 5 | 0.60 | 0.19 |
| 12 | 6 | 0.38 | −0.19 |
| 13 | 7 | 0.22 | −0.41 |
| 14 | 8 | 0.11 | −0.52 |
| 15 | 9 | 0.08 | −0.60 |
| 16 | 10 | 0.11 | −0.71 |
| 17 | 11 | 0.22 | −0.93 |
| 18 | 12 | 0.38 | −1.31 |
| 19 | 13 | 0.60 | −1.91 |
| 20 | 14 | 0.85 | −2.76 |
| 21 | 15 | 1.12 | −3.88 |
| 22 | 16 | 1.39 | −5.28 |
| 23 | 17 | 1.65 | −6.92 |
| 24 | 18 | 1.86 | −8.79 |
| 1 | 19 | 2.03 | −10.82 |
| 2 | 20 | 2.13 | −12.95 |
| 3 | 21 | 2.17 | −15.12 |
| 4 | 22 | 2.13 | −17.26 |
| 5 | 23 | 2.03 | −19.29 |
| 6 | 24 | 1.86 | −21.15 |

In this case, the heating autonomy is 5 h, less than the minimum autonomy desired by the user (8 h). The system will therefore estimate the energy to be loaded into the boiler.

(5.2) Estimation of the Amount of Energy to be Loaded into the Boiler:
The system calculates the following values:
the maximum energy which may be stored in the tank:

$$E_{storage\_max\ i} = V_{tan\_k} \times C_p \times (T_{tan\_k\_max} - T_{tan\_k\_min})$$

$$E_{storage\_max\ i} = \frac{1000 \times 4.18 \times (90-40)}{3600} = 58.06 \text{ kWh}$$

the maximum energy which may be loaded into the boiler:

$$E_{boiler\_max\ i} = V_{hearth} \times \rho_{boiler} \times LHP_{fuel}$$

$$E_{boiler\_max\ i} = \frac{50}{1000} \times 0.8 \times 1400 = 56 \text{ kWh}$$

In this equation, LHP represents the lower heat power, (LHP=140 kWh/m³ for wood and ρ=0.8);

the minimum energy which may be loaded into the boiler:

$$E_{boiler\_mini} = 0.5 \times E_{boiler\_maxi}$$

$$E_{boiler\_mini} = 0.5 \times 56 = 28 \text{ kWh}$$

The energy to be loaded into the boiler is therefore equal to:

$$E_{boiler\_to\_be\_loaded} = E_{storage\_maxi} - E_{storage\_avail} = 58.06 - 5.81 = 52.25 \text{ kWh}$$

This value is much larger than the minimum energy which may be loaded into the boiler $E_{boiler\_mini}$ and less than the maximum energy which may be loaded into the boiler $E_{boiler\_maxi}$.

Step 6:
The following information is transmitted to the user via a display:
Available energy in the tank:

$$\text{Display\_}E_{storage} = \frac{E_{storage}}{E_{storage\_max\ i}} = \frac{5.81}{58.06} = 10\%$$

The available energy therefore corresponds to 10% of the maximum supply.
Heating autonomy:

$$\text{Display\_Autonomy} = 5 \text{ h}$$

Energy to be loaded into the boiler:

$$\text{Display\_}E_{boiler\_to\_be\_loaded} = \frac{E_{boiler\_to\_be\_loaded}}{E_{boiler\_max\ i}} = \frac{52.25}{56} = 93\%$$

The user should therefore load his/her boiler to 93% relatively to a full load.

Example 2

Adjustment of the Energy Signature of the Building and Estimation of the Energy to be Loaded into the Boiler There again, a period P of 24 hours (which does not necessarily begins at 0.00 am) is considered.
The device for assisting with the loading is installed on a heating system 4, 4' consisting of a 25 kW wood boiler 4 with a hearth of 50 L and of a water storage tank 4' of 1,000 L. The user has adjusted the set room temperature to 20° C.
The user has adjusted the system with the following parameters:
Set indoor temperature: 20° C. constant,
Volume of the hearth of the boiler 4: 50 liters,
Volume of the storage tank 4': 1,000 liters.
Type of emitters: radiators;
Desired minimum autonomy: 8 h.
The values measured during the period P-1 are:
maximum temperature: 15° C.;
minimum temperature: 5° C.;
daily average indoor temperature: 19.8° C.
It is 0.00 am, the measured outdoor temperature is then 6° C. The temperature measured at 10 pm, the day before, was 9° C.
Steps 1-6 will now be applied.

Step 1:

(1.1) Estimation of the Average Outdoor Temperature for the Period P:

The last estimation of the average outdoor temperature for the period P (the next 24 hours in the selected example) was made at 10 pm.

$$T_{out\_avg\_P} = E_{out\_measured\_10\,pm} = 9.0° \text{ C.}$$

The minimum and maximum temperatures over the period P (the next 24 hours in the selected example) are estimated:

$$T_{out\_min\_P} = 2 \times T_{out\_avg\_P} - T_{out\_max\_P-1} = 2 \times 9 - 15 = 3° \text{ C.}$$

and $$T_{out\_max\_P} = T_{out\_max\_P-1} = 15° \text{ C.}$$

The system 6 then estimates the hourly profile of the outdoor temperature for the period P.

(1.2) Estimation of the Average Indoor Temperature for the Period P:

The set indoor temperature is 20° C. constant over the day.

(1.3) Estimation of the Difference Between the Average Indoor Temperature of the Period P and the Outdoor Temperature of the Period P:

The system 6 then calculates the difference between the hourly outdoor temperature and the set indoor temperature of the period P.

The values of these temperatures are detailed in the table below:

| Time of the day [H] | Interval between the present time and the estimation time [H − Ho] | Estimated outdoor temperature at time Ho [° C.] | Set indoor temperature at time H [° C.] | Indoor temperature − outdoor temperature difference [° C.] at time H |
|---|---|---|---|---|
| 1 | 1 | 3.8 | 20 | 16.2 |
| 2 | 2 | 3.2 | 20 | 16.8 |
| 3 | 3 | 3.0 | 20 | 17.0 |
| 4 | 4 | 3.2 | 20 | 16.8 |
| 5 | 5 | 3.8 | 20 | 16.2 |
| 6 | 6 | 4.8 | 20 | 15.2 |
| 7 | 7 | 6.0 | 20 | 14.0 |
| 8 | 8 | 7.4 | 20 | 12.6 |
| 9 | 9 | 9.0 | 20 | 11.0 |
| 10 | 10 | 10.6 | 20 | 9.4 |
| 11 | 11 | 12.0 | 20 | 8.0 |
| 12 | 12 | 13.2 | 20 | 6.8 |
| 13 | 13 | 14.2 | 20 | 5.8 |
| 14 | 14 | 14.8 | 20 | 5.2 |
| 15 | 15 | 15.0 | 20 | 5.0 |
| 16 | 16 | 14.8 | 20 | 5.2 |
| 17 | 17 | 14.2 | 20 | 5.8 |
| 18 | 18 | 13.2 | 20 | 6.8 |
| 19 | 19 | 12.0 | 20 | 8.0 |
| 20 | 20 | 10.6 | 20 | 9.4 |
| 21 | 21 | 9.0 | 20 | 11.0 |
| 22 | 22 | 7.4 | 20 | 12.6 |
| 23 | 23 | 6.0 | 20 | 14.0 |
| 24 | 24 | 4.8 | 20 | 15.2 |

Step 2:

(2.1) Definition of the Energy Signature:

With the measurement of the outdoor temperatures, indoor temperatures and of the heating needs of the previous periods (P-1, P-2 . . . , etc.), the energy signature of the building may be determined:

$$B_{heating} = a \times (T_{int} - T_{out})^2 + b \times (T_{int} - T_{out}) + c \, [\text{kWh}]$$

with: a=0; b=6.28; c=−29.56

(2.2) Adjustment of the Parameters of the Energy Signature of the Building:

The average indoor temperature measured for the previous period (the last 24 hours in the selected example) is 19.8° C.

The average outdoor temperature measured for the previous period is:

$$T_{out\_avg\_P-1} = \frac{T_{out\_max\_P-1} + T_{out\_min\_P-1}}{2} = \frac{15+5}{2} = 10° \text{ C.}$$

Therefore, the difference between the average indoor temperature and the average outdoor temperature of the previous period P-1 is:

$$T_{int\_avg\_P-1} - T_{out\_avg\_P-1} = 19.8 - 10 = 9.8° \text{ C.}$$

From this value and from the energy signature of the building, the system estimates the heating needs of the previous period P-1:

$$B_{heating\_estimated} = 0 \times (9.8)^2 + 6.28 \times (9.8) - 29.56 = 31.98 \, [\text{kWh}]$$

The actual heating needs measured for period P-1 is 33.2 kWh. As the estimated heating needs and the actual heating needs are different, the system will readjust the parameters of the energy signature from the algorithm explained below.

The parameters of the energy signature of the building are then readjusted to:

a=0
b=6.30
c=−29.70

The readjustment of the parameters may occur for example for all periods P, for example every 24 hours at an hour defined as being 0 hours.

Step 3:

(3.1) Estimation of the Daily Heating Needs of the Period P:

The heating needs are estimated for the next period P with the readjusted formula of the energy signature; they are here:

$$B_{heating\_P} = a \times (T_{int\_avg\_P} - T_{out\_avg\_P})^2 + b \times (T_{int\_avg\_P} - T_{out\_avg\_P}) + c$$

$$B_{heating\_P} = 0 \times (20-9)^2 + 6.30 \times (20-9) - 29.70 = 39.6 \text{ kWh}$$

(3.2) Estimation of the Hourly Distribution of the Daily Heating Needs of the Period P:

The hourly profile of the heating needs is calculated from the following equation, obtained with the readjusted formula of the energy signature:

$$B_{heating\_H\_P} = \frac{a \times (T_{int\_H\_P} - T_{out\_H\_P})^2 + b \times (T_{int\_H\_P} - T_{out\_H\_P}) + c}{24}$$

For the 1$^{st}$ hour following the present hour, the heating needs are:

$$B_{heating\_H1\_P} = \frac{0 \times (20-3.8)^2 + 6.30 \times (20-3.8) - 29.70}{24} = 3.01 \text{ kWh}$$

The table below summarizes the estimation of the hourly profile of the heating needs:

| Time of the day [H] | Interval between the present time and the estimation time [H – Ho] | Heating needs [kWh] at time H |
|---|---|---|
| 1 | 1 | 3.01 |
| 2 | 2 | 3.17 |
| 3 | 3 | 3.23 |
| 4 | 4 | 3.17 |
| 5 | 5 | 3.01 |
| 6 | 6 | 2.76 |
| 7 | 7 | 2.44 |
| 8 | 8 | 2.06 |
| 9 | 9 | 1.65 |
| 10 | 10 | 1.24 |
| 11 | 11 | 0.86 |
| 12 | 12 | 0.54 |
| 13 | 13 | 0.29 |
| 14 | 14 | 0.13 |
| 15 | 15 | 0.08 |
| 16 | 16 | 0.13 |
| 17 | 17 | 0.29 |
| 18 | 18 | 0.54 |
| 19 | 19 | 0.86 |
| 20 | 20 | 1.24 |
| 21 | 21 | 1.65 |
| 22 | 22 | 2.06 |
| 23 | 23 | 2.44 |
| 24 | 24 | 2.76 |

Step 4:

(4.1) Estimation of the Usable Energy Available in the Accumulation System:

The system estimates the usable energy available in the storage tank. To do this, 3 temperature sensors were installed at the following relative heights: $1/6^{th}$ of the tank ($T_{tank1}$), $1/2$ of the tank ($T_{tank2}$) and $5/6^{th}$ of the tank ($T_{tank3}$).

These measurements of temperatures indicate the following values:

$T_{tank1}$: 45° C.
$T_{tank2}$: 50° C.
$T_{tank3}$: 55° C.

From these 3 measurements of temperatures, the system calculates the energy available in the tank from the following equation:

$$E_{storage} = V_{tan\_k} \times C_p \times \left( \frac{T_{tan\_k1} + T_{tan\_k2} + T_{tan\_k3}}{3} - T_{tan\_k\_min} \right)$$

The volume of the tank $V_{tank}$ is 1,000 liters, the heat capacity $C_p$ of water is 4.18 kJ/kg/K (water) and the minimum temperature of the tank $T_{tank\_min}$ which corresponds to the minimum temperature which may be used by the heating system is 40° C. in this case (the emitters 15 are radiators):

$$E_{storage} = \frac{1000 \times 4.18 \times \left( \frac{45 + 50 + 55}{3} - 40 \right)}{3600} = 11.61 \text{ kWh}$$

Step 5:

(5.1) Estimation of the Heating Autonomy:

The system 6 estimates the heating autonomy from the usable energy available in the storage tank and from the prediction of the heating needs:

| Time of the day [H] | Interval between the present time and the estimation time [H – Ho] | Heating needs [kWh] at time H | Remaining energy in the storage tank [kWh] at time Ho |
|---|---|---|---|
| 0 | 0 | — | 11.61 |
| 1 | 1 | 3.01 | 8.60 |
| 2 | 2 | 3.17 | 5.42 |
| 3 | 3 | 3.23 | 2.20 |
| 4 | 4 | 3.17 | −0.97 |
| 5 | 5 | 3.01 | −3.99 |
| 6 | 6 | 2.76 | −6.75 |
| 7 | 7 | 2.44 | −9.19 |
| 8 | 8 | 2.06 | −11.24 |
| 9 | 9 | 1.65 | −12.89 |
| 10 | 10 | 1.24 | −14.14 |
| 11 | 11 | 0.86 | −15.00 |
| 12 | 12 | 0.54 | −15.54 |
| 13 | 13 | 0.29 | −15.82 |
| 14 | 14 | 0.13 | −15.95 |
| 15 | 15 | 0.08 | −16.03 |
| 16 | 16 | 0.13 | −16.15 |
| 17 | 17 | 0.29 | −16.44 |
| 18 | 18 | 0.54 | −16.98 |
| 19 | 19 | 0.86 | −17.84 |
| 20 | 20 | 1.24 | −19.08 |
| 21 | 21 | 1.65 | −20.73 |
| 22 | 22 | 2.06 | −22.79 |
| 23 | 23 | 2.44 | −25.23 |
| 24 | 24 | 2.76 | −27.99 |

In this case, the heating autonomy is 3 h, less than the minimum autonomy desired by the user (8 h). The system will therefore estimate the energy to be loaded into the boiler.

(5.2) Estimation of the Amount of Energy to be Loaded into the Boiler:

The system calculates the following values:

the maximum storable energy in the tank:

$$E_{storage\_max\_i} = V_{tan\_k} \times C_p \times (T_{tan\_k\_max} - T_{tan\_k\_min})$$

$$E_{storage\_max\_i} = \frac{1000 \times 4.18 \times (90 - 40)}{3600} = 58.06 \text{ kWh}$$

the maximum energy which may be loaded into the boiler:

$$E_{boiler\_max\_i} = V_{hearth} \times \rho_{boiler} \times LHP_{fuel}$$

$$E_{boiler\_max\_i} = \frac{50}{1000} \times 0.8 \times 1400 = 56 \text{ kWh}$$

the minimum energy which may be loaded into the boiler:

$$E_{boiler\_mini} = 0.5 \times E_{boiler\_maxi}$$

$$E_{boiler\_mini} = 0.5 \times 56 = 28 \text{ kWh}$$

The energy to be loaded into the boiler is equal to:

$$E_{boiler\_to\_load} = E_{storage\_maxi} - E_{storage\_avail} = 58.06 - 11.61 = 46.45 \text{ kWh}$$

This value is much higher than the minimum energy which may be loaded into the boiler and less than the maximum energy which may be loaded into the boiler.

Step 6:
The following information is transmitted to the user via a display 6':
Energy available in the tank:

$$\text{Display\_E}_{storage} = \frac{E_{storage}}{E_{storage\_max\ i}} = \frac{11.61}{58.06} = 20\%$$

The available energy therefore corresponds to 10% of the maximum supply.
Heating autonomy:

$$\text{Display\_Autonomy} = 3\ h$$

Energy to be loaded into the boiler:

$$\text{Display\_E}_{boiler\_to\_be\_loaded} = \frac{E_{boiler\_to\_be\_loaded}}{E_{boiler\_max\ i}} = \frac{46.45}{56} = 83\%$$

The user should therefore load his/her boiler to 83% relatively to a full load.

The two examples given above may be adapted to any period P with a duration different from 24 h.

Following an estimation conducted according to the invention, a user may load his/her boiler with the indicated amount of fuel.

The invention may be installed on all heating installations with a solid fuel boiler, either existing or future installations, for example coupled to a buffer tank: the installed system will then be an independent system. For future or refurbished installations, this system may also be integrated with regulation means which already manage the heating areas: the system is then combined with heating regulation.

Application of a method and of a device according to the invention is simple and does not require any action from the user except for initial parameterization of data which are easily known to him/her.

The system is self-adaptive and may be installed on all solid fuel heating installations having an accumulation system, in any region and in any building.

The expected primary energy savings, the reductions in pollutant emissions, vary between 20 and 60% relatively to a user who identically loads his/her solid fuel boiler every day.

The invention claimed is:

1. A method for estimating the fuel supply of a boiler, for a building having a boiler and energy accumulation means, in order to ensure a desired indoor temperature during an autonomy period P, this method including the following steps:
   a) making an estimation, by a data processing device based on received temperature data, of the average outdoor temperature during the autonomy period P, the autonomy period P being a predetermined period of time during which the boiler and accumulation means will continue to function to ensure the desired indoor temperature without requiring additional fuel to be loaded into the boiler,
   b) said data processing device determining an energy consumption of the building in order to ensure said desired indoor temperature from the previous estimation of the average outdoor temperature,
   c) said data processing device determining the amount of energy to be provided depending on the previous consumption, and said data processing device determining the amount of fuel required for the boiler for providing said amount of energy,
   wherein step c) at least takes into account:
   a heating autonomy at the beginning of the period P, the heating autonomy being the time during which energy available in the accumulation system is able to meet heating needs of the building,
   the maximum amount of energy which may be stored in the accumulation means,
   the minimum amount of energy which may be loaded into the boiler,
   and the maximum amount of energy which may be loaded into the boiler.

2. The method according to claim 1, wherein step a) applies a measurement of an outdoor temperature, either instantaneous and/or conducted during a period prior to the autonomy period P.

3. The method according to claim 1, wherein step b) applies a determination of a characteristic of the building, a energy signature, which represents the consumption of the building based on the difference between an indoor temperature $T_{int}$ and an outdoor temperature $T_{out}$.

4. The method according to claim 3, wherein the estimated heating needs and the actual heating needs are compared for a period prior to the period P, and the energy signature is corrected depending on the result of this comparison.

5. The method according to claim 1, wherein the amount of energy to be loaded is equal to the smallest of the following two amounts:
   the difference between the maximum energy which may be stored in the accumulation means and the available energy in the accumulation means;
   the maximum energy which may be loaded into the boiler, and this while being larger than the minimum energy which may be loaded into the boiler.

6. The method according to claim 1, wherein an estimation of at least one instantaneous outdoor temperature is further made during the autonomy period P, and an hourly distribution of the heating needs is estimated during this period P.

7. A device for estimating the fuel supply of a boiler having accumulation system, for a building, including a data processing device programmed for:
   a) determining an energy consumption of the building, by said data processing device based on received temperature data, in order to ensure a desired indoor temperature for an autonomy period P, from an estimation of an average outdoor temperature during the autonomy period P, the autonomy period P being a predetermined period of time during which the boiler and accumulation system will continue to function to ensure the desired indoor temperature without requiring additional fuel to be loaded into the boiler,
   b) determining, by said data processing device, the amount of energy to be provided depending on the previous consumption, and determining, by said data processing device, the amount of fuel required by the boiler to provide said amount of energy,
   wherein item b) at least takes into account:
   a heating autonomy at the beginning of the period P, the heating autonomy being the time during which energy available in the accumulation system is able to meet heating needs of the building,
   the maximum amount of energy which may be stored in the accumulation system,
   the minimum amount of energy which may be loaded into the boiler, and the maximum amount of energy which may be loaded into the boiler.

8. A heating system for a building, including:
a boiler for carrying out combustion of a fuel, and means for accumulating energy,
a device, according to the preceding claim, for estimating the fuel supply of the boiler.

9. The heating system according to the preceding claim, wherein at least one sensor is configured to measure at least one temperature outside the building and at least one indoor temperature.

10. The system according to claim 8, further including sensors measuring the amount of energy available in the accumulation system.

11. A building having a heating system according to claim 9, and heating means.

12. A heating system for a building, including:
a boiler for carrying out combustion of a fuel, and means for accumulating energy,
a device for estimating the fuel supply of the boiler, said device including a computer programmed for:
a) determining an energy consumption of the building in order to ensure a desired indoor temperature for an autonomy period P, from an estimation of an average outdoor temperature during the autonomy period P, the autonomy period P being a predetermined period of time during which the boiler and means for accumulating energy will continue to function to ensure the desired indoor temperature without requiring additional fuel to be loaded into the boiler,
b) determining the amount of energy to be provided depending on the previous consumption, and the amount of fuel required by the boiler to provide this energy,
c) said device determining the amount of energy to be provided depending on the previous consumption, and said device determining the amount of fuel required for the boiler for providing said amount of energy,
wherein item c) at least takes into account:
a heating autonomy at the beginning of the period P, the heating autonomy being the time during which energy available in the accumulation system is able to meet heating needs of the building,
the maximum amount of energy which may be stored in the accumulation system,
the minimum amount of energy which may be loaded into the boiler,
and the maximum amount of energy which may be loaded into the boiler.

13. A building having a heating system, including:
a boiler for carrying out combustion of a fuel, and means for accumulating energy,
heating means,
at least one sensor measuring at least one temperature outside the building and at least one indoor temperature,
a device for estimating the fuel supply of the boiler, said device including a computer programmed for:
a) determining an energy consumption of the building in order to ensure a desired indoor temperature for an autonomy period P, from an estimation of an average outdoor temperature during the autonomy period P, the autonomy period P being a predetermined period of time during which the boiler and accumulation system will continue to function to ensure the desired indoor temperature without requiring additional fuel to be loaded into the boiler,
b) determining the amount of energy to be provided depending on the previous consumption, and the amount of fuel required by the boiler to provide this energy,
c) said device determining the amount of energy to be provided depending on the previous consumption, and said device determining the amount of fuel required for the boiler for providing said amount of energy,
wherein item c) at least takes into account:
a heating autonomy at the beginning of the period P, the heating autonomy being the time during which energy available in the accumulation system is able to meet heating needs of the building,
the maximum amount of energy which may be stored in the accumulation system,
the minimum amount of energy which may be loaded into the boiler,
and the maximum amount of energy which may be loaded into the boiler.

* * * * *